United States Patent [19]
Aldridge et al.

[11] Patent Number: 5,180,008
[45] Date of Patent: Jan. 19, 1993

[54] WELLHEAD SEAL FOR WIDE TEMPERATURE AND PRESSURE RANGES

[75] Inventors: Tod Aldridge, Spring, Tex.; John A. Fitzgerald, Singapore, Singapore; Allan K. McGregor, Sarawak, Mali; Ronald D. Quates; Rudolf R. Schoen, both of Houston, Tex.; Appavoo Thangarasu, Singapore, Singapore; John C. Vicic, Spring, Tex.

[73] Assignee: FMC Corporation, Chicago, Ill.

[21] Appl. No.: 810,753

[22] Filed: Dec. 18, 1991

[51] Int. Cl.⁵ .............................................. E21B 33/04
[52] U.S. Cl. ...................................... 166/84; 277/34; 285/96
[58] Field of Search ................... 166/84; 277/34, 34.3, 277/34.6; 285/96, 97, 101

[56] References Cited

U.S. PATENT DOCUMENTS

| | | | |
|---|---|---|---|
| 2,071,197 | 2/1937 | Burns et al. | 277/34 |
| 2,192,805 | 3/1940 | Seamark | 277/34 |
| 2,196,668 | 4/1940 | Ragan | 277/34 |
| 2,945,665 | 7/1960 | Regan et al. | 277/34 |
| 3,582,112 | 6/1971 | Pico | 285/96 |
| 3,614,111 | 10/1971 | Regan | 166/84 |
| 4,206,929 | 6/1980 | Bruce | 277/34 |
| 4,345,735 | 8/1982 | Regan | 277/34.3 |
| 4,411,434 | 10/1983 | Lewis | 285/96 |
| 5,044,442 | 9/1991 | Nobileau | 166/348 |
| 5,062,479 | 11/1991 | Bailey et al. | 166/84 |

Primary Examiner—Ramon S. Britts
Assistant Examiner—Frank S. Tsay
Attorney, Agent, or Firm—Richard B. Megley; William Ritt, Jr.

[57] ABSTRACT

A wellhead seal for establishing and maintaining a seal between a wellhead and inner pipe element. The seal is an annular elastomeric body having an inner axial surface with a generally convex central portion for pressing against the inner pipe element surrounded by the wellhead and an outer axial surface with a generally concave central portion which, in one embodiment, receives an annular energizing element to increase the sealing force between the body and casing. An annular anti-extrusion ring is provided at the inner edge of each radial end surface.

7 Claims, 2 Drawing Sheets

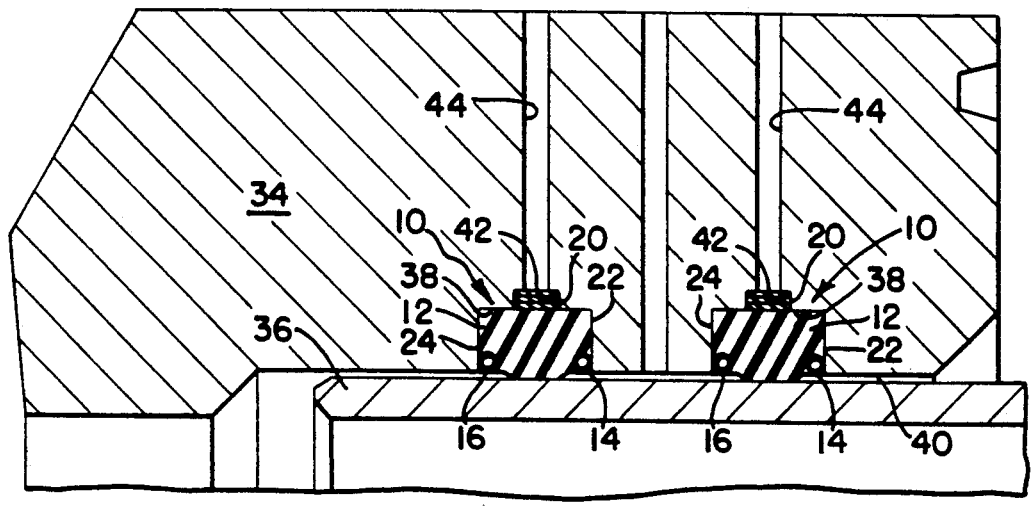
FIG_1
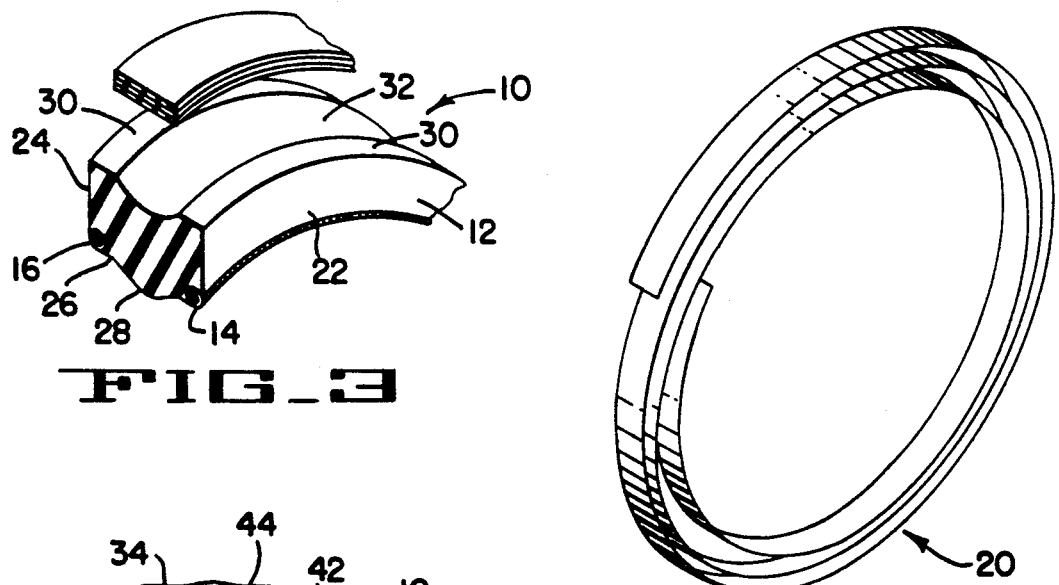
FIG_3
FIG_4
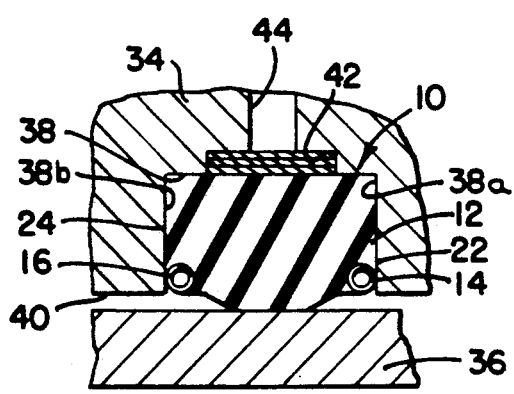
FIG_2

WELLHEAD SEAL FOR WIDE TEMPERATURE AND PRESSURE RANGES

BACKGROUND OF THE INVENTION

This invention relates to seals for use between oil field casing and wellheads, and more particularly to elastomeric seals for such use under conditions of high temperature and pressure.

During the course of drilling wells for the production of crude oil, natural gas, water, steam and other fluids it is not uncommon to encounter pressures and temperatures of a wide range, and also chemicals that are corrosive and/or otherwise harmful to the drilling equipment. Past efforts to combat these problems have included wellhead seals of many configurations and compositions that have produced results of varying success or failure. The problem is more difficult when attempting to adequately seal between a wellhead and a non-machined or otherwise rough casing surface, especially when extremes of pressure, temperature and/or chemical activity are present. Oilfield casing diameters are manufactured with a tolerance range of plus 1 percent to minus one-half of one percent of the nominal outside diameter, and this range can be so large that the traditional elastomer seals cannot bridge the gap between the wellhead and casing. Thus prior to the present invention there was a need for a new seal that would maintain its sealing effect throughout the entire range of tolerance variation, as well as over a wide temperature and pressure range.

SUMMARY OF THE INVENTION

The present invention comprises an improved wellhead seal for establishing and maintaining a leak-proof pressure barrier between a wellhead and an inner pipe element such as a casing or casing hunger, and especially between a wellhead surface and an un-machined or otherwise rough surface on a casing. The seal of this invention is effective against high pressure liquid and gaseous well fluids over a wide temperature range and in the presence of chemically adverse wellbore environments encountered at many drilling sites.

The seal comprises an annular elastomeric body having a generally rectangular cross-section with a pair of flat radial end surfaces, an inner axial surface with a generally convex central portion, and an outer axial surface with a generally concave central portion. The body has a pair of annular inner edges, one at each intersection of the inner surface with the side surfaces, and at each inner edge is a helically coiled annular anti-extrusion spring or other suitable extrusion limiting device to prevent flow (extrusion) of elastomer when the seal is in functional position between a wellhead and an inner casing, casing hanger or other well element.

The seal is designed for installation in an annular groove or chamber in an inner annular surface of a wellhead, with the convex portion pressing against a well casing, casing hanger, or other well element surrounded by the wellhead. As an option, an annular energizing spring that fits against the outer concave surface of the body can be included to increase the sealing force between the body and the casing, the hanger or other inner well element. This spring preferably has a generally arcuate cross-sectional configuration that resists flattening of the spring when the seal is in functional position between a wellhead and a casing, and has spaced axial slots extending alternately from its opposite edges towards or somewhat beyond its centerline to increase its flexibility for easier installation in the wellhead. Alternatively, a backing element, such as a strip of relatively thin metal, can be wrapped around the body outer surface to provide a means for transmitting a radial compressive force to the body in response to injection of plastic or plastic-type viscous fluid or semi-solid material behind the seal for increasing its sealing capability.

BRIEF DESCRIPTION OF THE DRAWINGS

FIG. 1 is a fragmentary sectional view of two seals according to the present invention in functional position between an outer wellhead and an inner well casing.

FIG. 2 is an enlarged portion of FIG. 1 showing one of the seals in functional position.

FIG. 3 is an isometric fragmentary exploded view of the seal and its backing element of FIGS. 1 and 2.

FIG. 4 is an isometric view of the backing element of FIGS. 1-3.

DESCRIPTION OF THE PREFERRED EMBODIMENT

Figure 5:
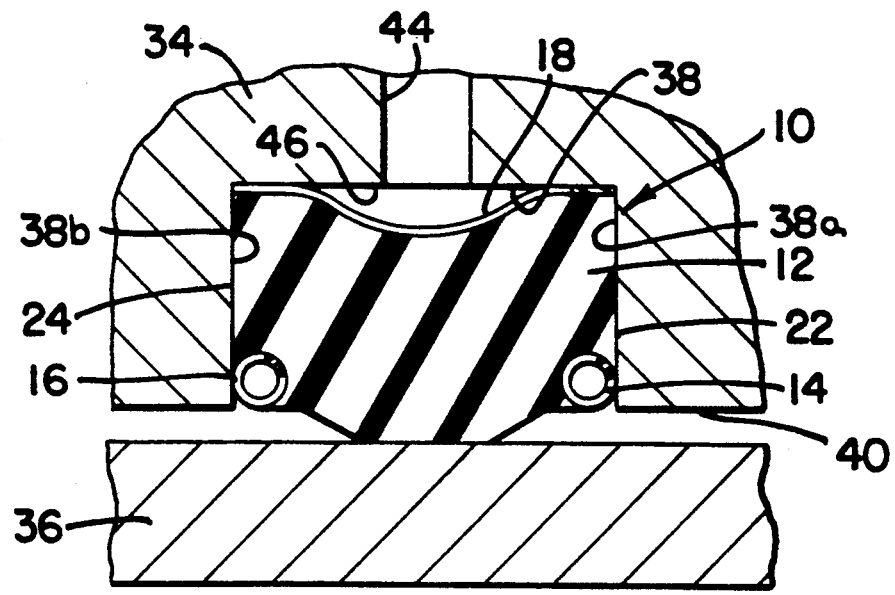
FIG. 5 is an enlarged fragmentary sectional view of a seal body and an energizing spring in functional position between a wellhead and an inner well casing.

As illustrated in FIGS. 1-6, a seal assembly 10 according to the present invention comprises an annular elastomeric seal body 12, a pair of helically coiled annular anti-extrusion springs 14, 16, and either an annular energizing spring 18 (FIGS. 5 and 6) that is generally arcuate-shaped in cross section or an annular backing element 20 (FIGS. 1-4) that has a flat configuration in cross section.

The seal body 12 has two flat radial end surfaces 22, 24, an inner axial surface 26 with a generally convex central portion 28, and an outer axial surface 30 with a generally concave central portion 32. The volume of the convex central portion 28 can be, but is not necessarily, equal tot he volume of the concavity of the portion 32 so that when the seal body 12 is compressed, such as between a wellhead 34 and an inner casing 36 (FIGS. 1 and 2), the concavity affords a place for the elastomer to migrate without undesirable extrusion or hydrostatic confinement. The anti-extrusion springs 14, 16 can be molded to, or separately positioned against, the seal body 12 at the inner edges of the radial surfaces 22, 24, one spring at each edge, to prevent extrusion of the body from its annular chamber 38 in the wellhead 34 into the annular space 40 between the wellhead and the casing 36.

When it is desirable to energize the seal body 12 by plastic injection, a strip of flat metal, plastic, composites, fabric or other suitable material is wound around the outer surface 32 to provide a single or multi-layer backing, such as the three-layer annular backing element 20, and a secondary groove 42 is provided in the wellhead 34 to accept this element 20. Extending between the groove 42 and the exterior of the wellhead 34 are two or other plurality of spaced injection ports 44 (only one shown) for injecting plastic or other suitable material behind the element 20 and the seal body 12, thereby to provide an additional boost of sealing force to the seal. The backing element 20 helps to evenly distribute the injected material around the groove and also prevents elastomer from extruding into the injection ports 44 when no plastic or other material is present in these ports. As is conventional, a check valve or a pipe plug (neither shown) is provided on the wellhead 34 at each port 44 to close it and retain the injected material under pressure.

Figure 6:
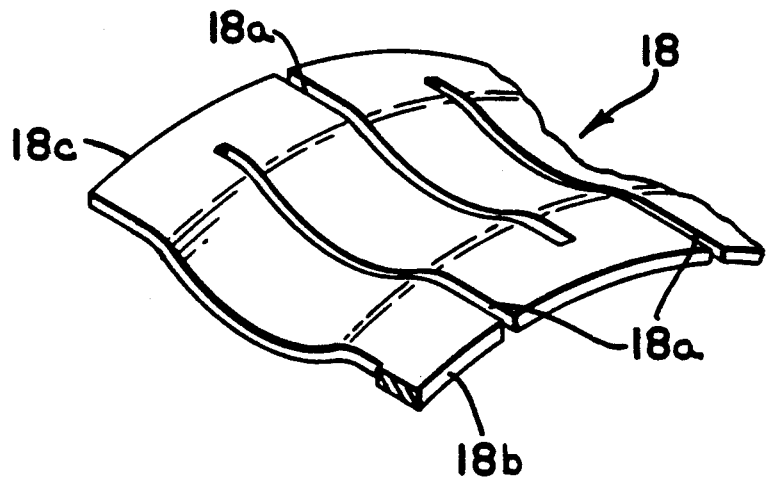
FIG. 6 is an isometric fragmentary view of the energizing spring of FIG. 5.

As illustrated in FIG. 5, the generally arcuate-shaped annular spring 18, made from relatively thin sheet metal, plastic, composites or other suitable material, conforms to the outer surface 30 with its concave central portion 32 of the seal body 12. The spring 18 is located between the seal body outer surface 30, 32 and the axial surface 46 of the seal chamber 38 when the seal is in functional position as shown in FIG. 5. The spring 18 functions to provide a boost of force to the seal body 12 to seal off high pressure gases and liquids. As shown in FIG. 6, the spring 18 has a plurality of circumferentially spaced axial slots 18a extending from alternate edges 18b, 18c of the spring towards the opposite edges, to provide the desired degree of resiliency to the spring. The slots 18a are not required for proper seal function, but are desirable to increase flexibility of the seal assembly to ease its installation into the chamber 38.

Functionally the assembly 10 is a static seal, but small axial movements of the casing 36 can be tolerated. Although the seal assembly 10 may be considered a pressure-energized seal, substantial initial interference between the seal body 12 and the casing 36 is required to initiate the sealing action.

The anti-extrusion springs 14, 16 preferably are coiled in a circular cross-sectional form, but they also can be square, rectangular, elliptical or other shape if desired. In special circumstances, rope or rings of rolled fabric, braided material, compressed metal cloth or foil, or other suitable anti-extrusion material may be used in place of the springs 14, 16.

Although illustrated as parallel, the sides (radial surfaces) 38a, 38b of the seal chamber 38 also can be non-parallel, or can include dovetail means to secure the seal body 12 to the chamber, if such is desired.

The seal assembly 10 of the present invention will hold pressures equal to or higher than the casing 36 for which it is designed. The temperature rating of the seal assembly 10 depends upon the material from which the seal body 12 is constructed, and proper selection of that material enables the seal to function from minus 75 to plus 600 degrees Fahrenheit, and in most chemical environments.

Although the best mode contemplated for carrying out the present invention has been herein shown and described, it will be apparent that modification and variation may be made without departing from what is regarded to be the subject matter of the invention.

What is claimed is:

1. A wellhead seal for wide temperature and pressure ranges, said seal comprising an assembly of
    a) an annular elastomeric body having two flat radial end surfaces, an inner axial surface with a generally convex central portion, and an outer axial surface with a generally concave central portion;
    b) a helically coiled annular anti-extrusion ring at the inner edge of each radial end surface where that surface intersects said inner axial surface; and
    c) an annular energizing element fitted around and residing against said outer axial surface of said body.

2. A wellhead seal according to claim 1 wherein said convex central portion volume is essentially the same as said concave central portion volume.

3. A wellhead seal according to claim 1 wherein said energizing element comprises a strip of stiff material wound around and in contact with said outer annular surface of said body.

4. A wellhead seal according to claim 3 wherein said energizing element extends a plurality of times around said body, thereby forming a plural-layered backup for said body.

5. A wellhead seal according to claim 3 functionally positioned in a wellhead having means to inject viscous fluid or semi-solid material behind said energizing element to enhance the sealing force of said seal.

6. A wellhead seal according to claim 1 wherein said energizing element comprises an annular spring fitted around and against said outer axial surface of said body, said spring having two annular edges and a generally arcuate-shaped cross section complementary to the configuration of said outer axial surface.

7. A wellhead seal according to claim 6 wherein said spring has a plurality of circumferentially spaced axial slots extending alternately from one spring edge towards the other spring edge.

* * * * *